(12) United States Patent
Weatherford

(10) Patent No.: US 7,324,041 B1
(45) Date of Patent: Jan. 29, 2008

(54) METHOD FOR SOLVING TWO RF SIGNALS' ANGULAR POSITION

(75) Inventor: Shaun David Weatherford, Camarillo, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 50 days.

(21) Appl. No.: 11/489,805

(22) Filed: Jul. 12, 2006

(51) Int. Cl.
*G01S 13/72* (2006.01)
*G01S 13/44* (2006.01)

(52) U.S. Cl. .................... 342/95; 342/99; 342/141; 342/147

(58) Field of Classification Search .......... 342/80, 342/90, 92–96, 99, 141, 147, 149
See application file for complete search history.

(56) References Cited

U.S. PATENT DOCUMENTS

| | | | |
|---|---|---|---|
| 3,795,913 A * | 3/1974 | Kosowsky et al. | 342/131 |
| 6,731,240 B2 * | 5/2004 | Dybdal et al. | 342/359 |
| 7,136,014 B2 * | 11/2006 | McCord et al. | 342/149 |
| 7,221,307 B1 * | 5/2007 | Friesel | 342/13 |
| 2003/0189512 A1 * | 10/2003 | Chen et al. | 342/160 |
| 2005/0035902 A1 * | 2/2005 | Eder et al. | 342/147 |
| 2005/0035903 A1 * | 2/2005 | Bergkvist | 342/160 |
| 2007/0182622 A1 * | 8/2007 | Weatherford | 342/149 |

* cited by examiner

*Primary Examiner*—Isam Alsomiri
(74) *Attorney, Agent, or Firm*—David S. Kalmbaugh

(57) ABSTRACT

A method for determining an angle for each of two RF signals at different frequencies and offset from each other. The average angle of a composite signal is obtained from the two RF signals over a frequency difference period by averaging the frequency difference period. The average angle of the composite signal is the dominant signal's angle. The smaller signal's angle is then calculated from the dominant signal's angle, an angle centroid, and the signal voltages for the two RF signals.

18 Claims, 4 Drawing Sheets

METHOD FOR SOLVING TWO RF SIGNALS' ANGULAR POSITION

BACKGROUND OF THE INVENTION

1. Field of the Invention

The present invention relates generally to radar used for tracking multiple targets. More specifically, the present invention relates to a method for solving for the angular position of two RF (radio frequency) signals.

2. Description of the Prior Art

Currently, military tracking radar is widely used to track targets and threats, such as enemy aircraft because of its high degree of accuracy and relative immunity to electronic countermeasures that can degrade tracking radar and their associated methods of tracking. Generally military tracking radar uses a single RF pulse to gather angle information, as opposed to directing multiple narrow-beam pulses in different directions and looking for a maximum return to identify the target.

When there are two targets being tracked by radar, two RF signals at different frequencies are generated. The two RF signals produce a beat pattern in power return, with beats occurring at the frequency difference between the two RF signals. This beat pattern is produced by adding the RF signals and then subtracting the RF signals.

With current angle processing techniques utilized to pull out the angle of the combined RF signal, the non-linearity of the processing technique ensures that for a difference greater than five percent between the powers of each signal, the angle as averaged over a beat period is almost entirely captured by the dominant of the two RF signals.

Currently utilized angle processing techniques use averaging to pull out the dominant signal. For those cases where two RF signals are changing in power return such that the two RF signals are alternating as to which one of the two signals is dominant, there is need for signal processing techniques to recognize when one signal's angle is appearing as opposed to the other signal's angle is appearing. This requirement necessitates that the angles for the two RF signals be sorted in time.

Further, since only one of the two RF signals is visible during any given time period, two types of adverse situations can occur with present angle processing techniques. First, the RF signal being analyzed can be dominated by the other RF signal during a critical time period, such that the RF signal information is being extrapolated. Second, the sorting of each RF signal can be confused by environmental angle disturbances.

Accordingly, angle processing would be substantially improved if both RF signals' angles are calculated simultaneously, even when one RF signal dominates the other of the two RF signals.

SUMMARY OF THE INVENTION

The present invention overcomes some of the difficulties of the past including those mentioned above in that the present invention provides for a relatively simple yet highly effective method for determining the angular position of two RF signals from the dominant RF signals power return data.

The method comprising the present invention requires the step of providing an angle voltage centroid between the two RF signals by a determination of an angle during peaks in power return. The method then requires the step of providing the dominant RF signal's angle which is determined by the average composite angle over the frequency difference period. The method also requires the step of providing the two RF signal voltages which are determined from peak and minimum power values. The step of calculating the smaller RF signals voltage is found from the values obtained for the angle voltage centroid for the two RF signals, the dominant RF signal's angle, and the two RF signal's voltages.

Thus, utilizing the method of the present invention, both RF signals' angles can be calculated simultaneously, even though one RF signal may be dominated by the other RF signal.

DETAILED DESCRIPTION OF A PREFERRED EMBODIMENT

Figure 1:
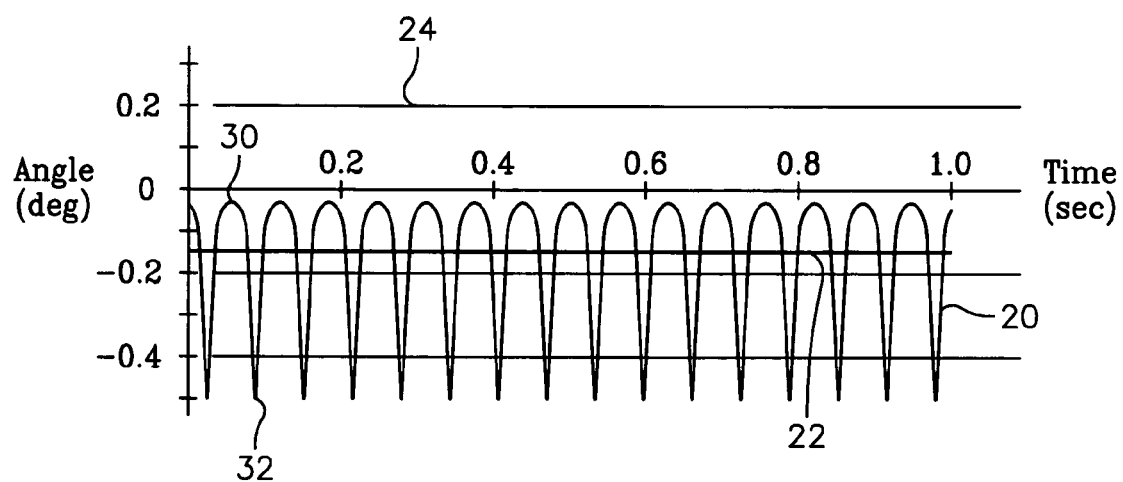
FIG. 1 are plots which illustrates a dominant RF signal's angle, a smaller signal's RF angle and a composite angle obtained by adding the two RF signals over a period.
Figure 2:
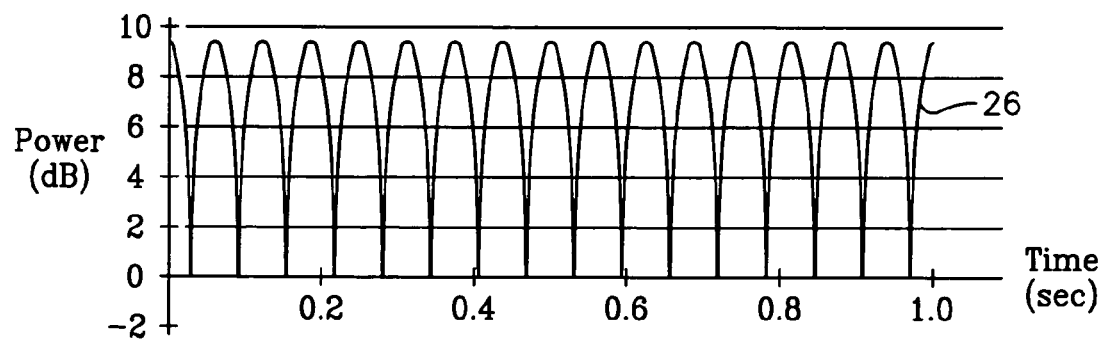
FIG. 2 is a composite plot which illustrates a composite power for the two RF signals of FIG. 1 over a period.
Figure 3:
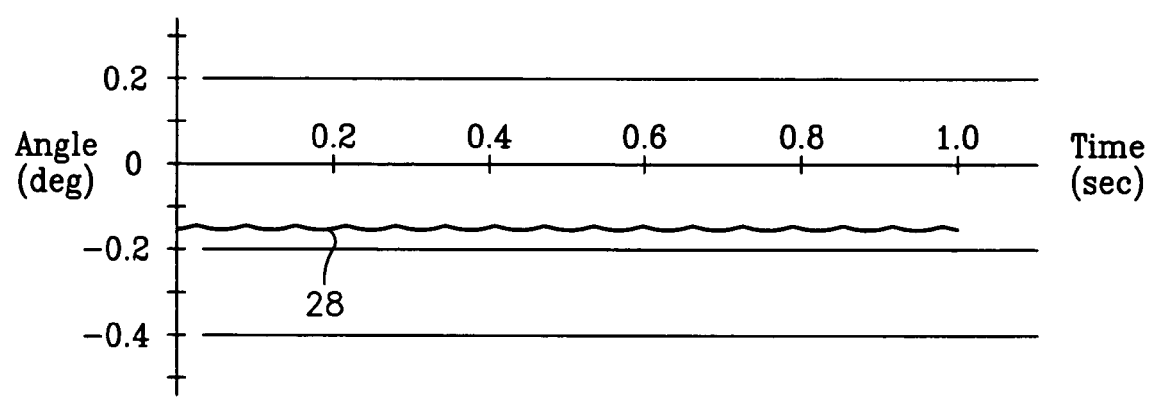
FIG. 3 is a period-averaged composite angle plot which illustrates an average of the composite angle for the two RF signals of FIG. 1 over a period.

Referring first to FIGS. 1, 2 and 3, FIG. 1 shows an angle plot for two RF signals over time which includes a composite angle obtained by adding two RF signals together. The plot identified by the reference numeral 20 is the composite angle for the two RF signals. The plot identified by the reference numeral 22 is the dominant RF signal's angle. The plot identified by the reference numeral 24 is the smaller RF signal's angle. FIG. 2 illustrates a composite power plot, identified by the reference numeral 26, for the RF signals over time.

FIG. 3 illustrates a period-averaged composite angle plot, identified by the reference 28, for the composite angle of the two RF signals over time. The period-averaged composite angle 28 of FIG. 3 is the dominant signal's angle over the time period of approximately one second and has a value of −0.15 degrees. It should be noted that the average of the period-averaged composite angle 28 of FIG. 3 is the same as the dominant signal's angle 22 of FIG. 2.

In addition to the average over the frequency difference period providing the dominant signal's angle (for signals with at least a 5% difference in power return), the angle during peaks in power return provides an angle voltage centroid between the two RF signals. For the example illustrated in FIGS. 1-3, the angle at peak power, identified by the reference 30 in FIG. 1 is −0.034 (FIG. 1) for a 1.9751 volt RF signal at −0.1511 degrees and a 0.9605 volt RF signal at 0.2027 degrees.

The centroid is determined using the following expression:

$$\text{Angle\_Centroid} = \frac{A1 \times Angle1 + A2 \times Angle2}{A1 + A2} \quad (1)$$

where:

A1 is the dominant RF signal's voltage and Angle1 is the dominant RF signal's angle (calculated via period averaging of composite); and A2 is the smaller RF signal's voltage and Angle2 is the smaller RF signal's angle.

The centroid is calculated using the expression as follows:

$$\text{Angle\_Centroid} = \frac{1.9751 \times -0.1511 + 0.9605 \times 0.2027}{1.9751 + 0.9605} = -0.035$$

This calculation confirms that the angle at the power peak is equal to the centroid.

The voltage magnitude of the two RF signals is calculated by noting the power at the peak of plot 24 (FIG. 2) and the power at the minimum of plot 24. The following expression are used to determine peak power and minimum power:

Power_Peak=(A1+A2)^2    (2)

Power_Min=(A1+A2)^2    (3)

The dominant RF signal's voltage A1 is calculated using the following expression:

A1=½×(sqrt(Power_Peak)+sqrt(Power_Min))    (4)

The smaller RF signal's voltage A2 is calculated using the following expression:

A2=½×(sqrt(Power_Peak)−sqrt(Power_Min))    (5)

For the plot illustrated in FIG. 2, the peak power is 9.36 dB and the minimum power is 0.078 dB. Converting from dB power to linear power results in the following:

Power_Peak=10^(9.36/10)=8.63

Power-Min=10^(0.078/10)=1.02

The dominant RF signal's voltage A1 is then calculated as follows:

A1=½×(sqrt(8.63)+sqrt(1.02))=1.97

The smaller RF signal's voltage A2 is then calculated as follows:

A2=½×(sqrt(8.63)−sqrt(1.02))=0.96

It should be note that the values of A1 and A2 calculated using expressions 4 and 5 are identical to the values used to determine the Angle_Centroid in expression (1).

The Angle_Centroid is also defined by the following expression:

Angle_Centroid=Angle_at_Power_Peak    (6)

and Angle1 is also defined by the following expression:

Angle1=Angle_Averaged_Over_Period    (7)

The average of Angle1 is calculated between nulls 32 (FIG. 1).

With the angle centroid Angle_Centroid being provided by the angle at which the power peaks, the dominant signal angle Angle being provided by the average composite angle over a frequency difference period, and the two signals' voltage A1 and A2 from the peak and minimum power values, the smaller signal's values can be calculated using the following expression:

Angle2=[(A1+A2)×Angle_Centroid−A1×Angle1]/A2    (8)

Thus, both RF signals' angles can be calculated simultaneously, even though one RF signal may be dominated by the other RF signal.

Figure 4:
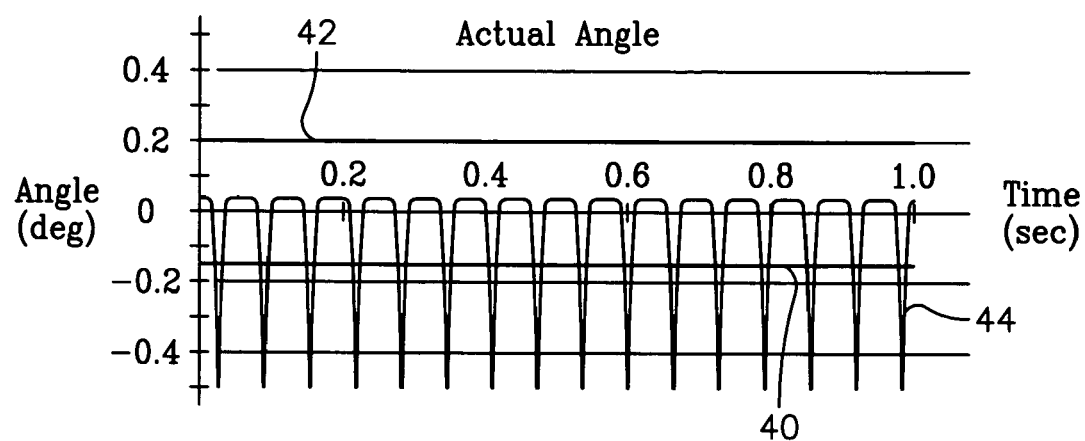
FIGS. 4-7 illustrate a pair of examples of two RF signals' signals added together and the resultant composite signal.
Figure 5:
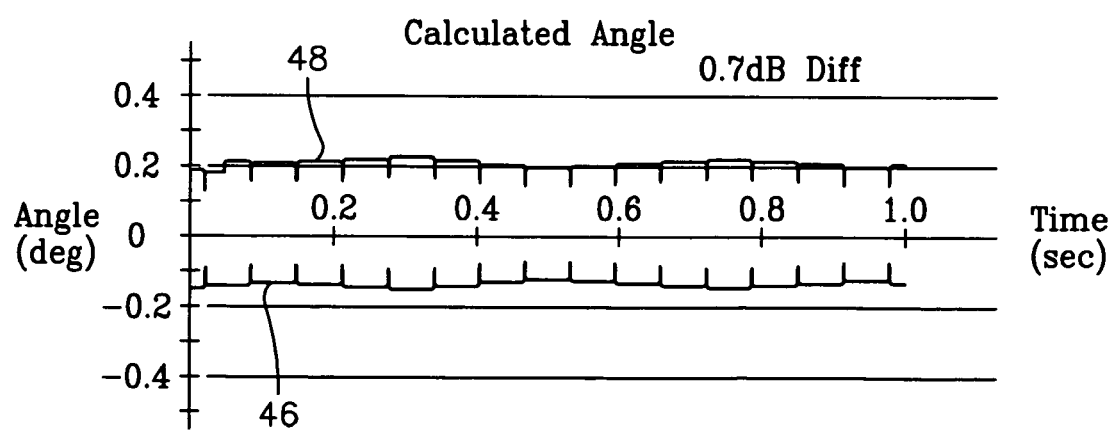

Referring to FIGS. 4-7, FIGS. 4 and 5 illustrate a first example of two RF signals' signals added together. In FIG. 4, plot 40 is the dominant RF signal's angle, plot 42 is the smaller signals' angle and plot 44 is the composite angle. FIG. 5 represents the calculated angle with plot 46 representing the calculated angle for the dominant RF signal and plot 48 representing the calculated angle for the smaller RF signal.

Figure 6:
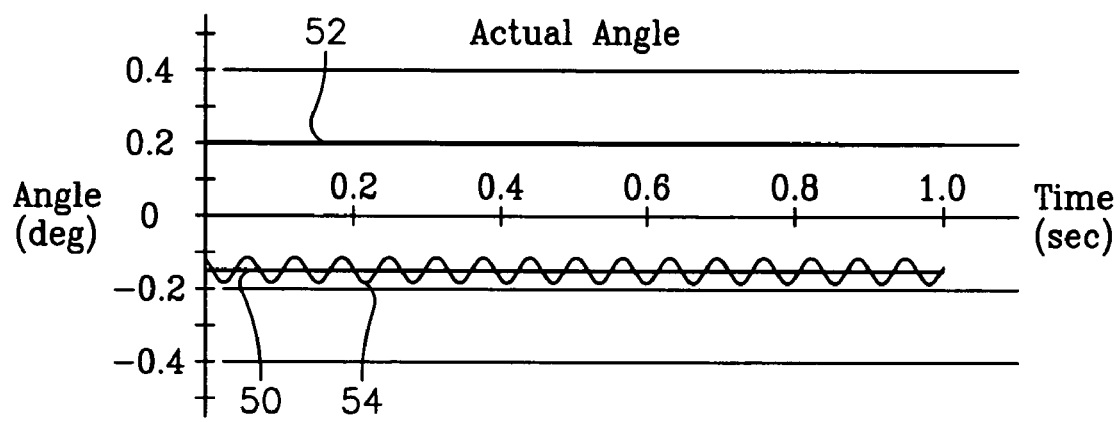
Figure 7:
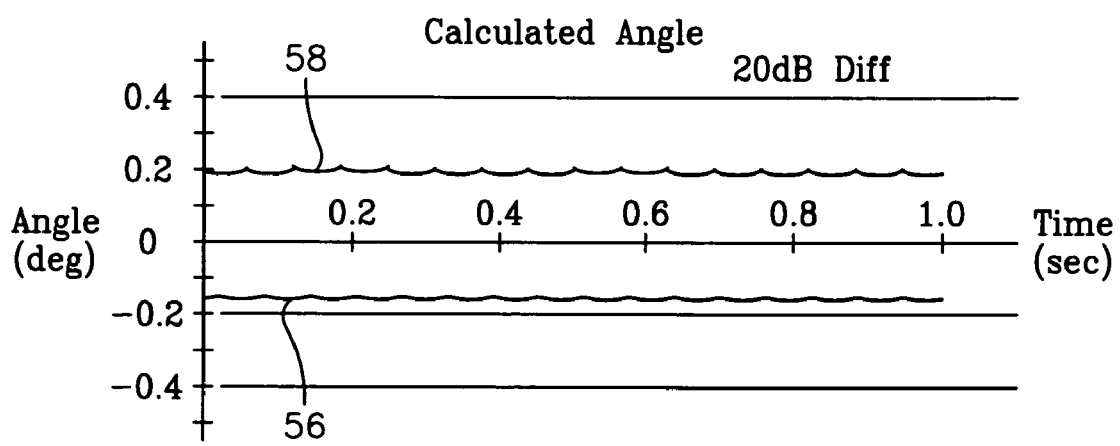

Similarly, FIGS. 6 and 7 illustrate a second example of two RF signals' signals added together. In FIG. 4, plot 50 is the dominant RF signals' angle, plot 52 is the smaller signals' angle and plot 54 is the composite angle. FIG. 5 represents the calculated angle with plot 56 representing the calculated angle for the dominant RF signal and plot 58 representing the calculated angle for the smaller RF signal.

Various power differences were used with the calculated angles of FIG. 5 having a 0.7 dB power difference, and the calculated angles of FIG. 7 having a 20 dB power difference.

From the foregoing, it may readily be seen that the present invention comprises a new, unique and exceedingly useful and effective method for solving for two RF signals' angular position which constitutes a considerable improvement over the known prior art. Many modifications and variations of the present inventions are possible in light of the above teachings. It is therefore to be understood that within the scope of the amended the invention may be practiced otherwise than as specifically described.

What is claimed is:

1. A method for calculating an angle for first and second RF signals comprising the steps of:
   (a) receiving a combined RF signal which includes said first RF signal reflected from a dominant target and said second RF signal from a secondary target, wherein said first and second RF signals have different frequencies and are offset in angle from one another;
   (b) calculating a dominant signal angle for said first RF signal by providing an average of a composite angle for said combined RF signals over a frequency difference period;
   (c) providing an angle centroid between said first and second RF signals wherein said angle centroid is provided by an angle at which peaks in power return for said combined RF signals occur;
   (d) calculating a voltage magnitude for each of said first and second RF signals wherein said voltage magnitude is calculated from peak and minimum power values for said combined RF signals; and
   (e) calculating a smaller signal angle for said second RF signal wherein said smaller signal angle is calculated from said dominant signal angle, said angle centroid, and the voltage magnitude for each of said first and second RF signal.

2. The method of claim 1 wherein said first and second RF signal have at least a five percent difference in power levels.

3. The method of claim 1 wherein said voltage magnitude for said first RF signal is calculated in accordance with the following expression:

A1=½×(sqrt(Power_Peak)+sqrt(Power_Min))

where: Power_Peak=10^(peak power for said combined RF signals/10), and Power_Min=10^(minimum power for said combined RF signals/10).

4. The method of claim 1 wherein said voltage magnitude for said second RF signal is calculated in accordance with the following expression:

A2=½×(sqrt(Power_Peak)−sqrt(Power_Min))

where: Power_Peak=10^(peak power for said combined RF signals/10), and Power_Min=10^(minimum power for said combined RF signals/10).

5. The method of claim 1 wherein said a dominant signal angle for said first RF signal is calculated in accordance with the following expression:

Angle1=Angle_Averaged_Over_Period.

6. The method of claim 5 wherein Angle1 is the average of the composite angle for said combined RF signal between nulls within said composite angle.

7. A method for calculating an angle for first and second RF signals comprising the steps of:
    (a) receiving a combined RF signal which includes said first RF signal reflected from a dominant target and said second RF signal from a secondary target, wherein said first and second RF signals have different frequencies and are offset in angle from one another;
    (b) calculating a dominant signal angle for said first RF signal by providing an average of a composite angle for said combined RF signal over a frequency difference period;
    (c) providing an angle centroid between said first and second RF signals wherein said angle centroid is provided by an angle at which peaks in power return for said combined RF signals occur;
    (d) calculating a voltage magnitude for each of said first and second RF signals wherein said voltage magnitude is calculated from peak and minimum power values for said combined RF signals; and
    (e) calculating a smaller signal angle for said second RF signal in accordance with the following expression:

Angle2=[(*A*1+*A*2)×Angle_Centroid−*A*1×Angle1]/*A*2 where A1 and A2 are the voltage magnitudes for said first and second RF signals, respectively. Angle_Centroid is the angle centroid between said first and second RF signals, and Angle1 is the dominant signal angle for said first RF signal.

8. The method of claim 7 wherein said first and second RF signal have at least a five percent difference in power levels.

9. The method of claim 7 wherein said voltage magnitude for said first RF signal is calculated in accordance with the following expression:

*A*1=½×(sqrt(Power_Peak)+sqrt(Power_Min))

where: Power_Peak=10^(peak power for said combined RF signals/10), and Power_Min=10^(minimum power for said combined RF signals/10).

10. The method of claim 7 wherein said voltage magnitude for said second RF signal is calculated in accordance with the following expression:

*A*2=½×(sqrt(Power_Peak)−sqrt(Power_Min))

where: Power_Peak=10^(peak power for said combined RF signals/10), and Power_Min=10^(minimum power for said combined RF signals/10).

11. The method of claim 7 wherein said dominant signal angle for said first RF signal is calculated in accordance with the following expression:

Angle1=Angle_Averaged_Over_Period.

12. The method of claim 11 wherein Angle1 is the average of the composite angle for said combined RF signal between nulls within said composite angle.

13. The method of claim 11 wherein said angle centroid is expressed by the following equation:

$$\text{Angle\_Centroid} = \frac{A1 \times Angle1 + A2 \times Angle2}{A1 + A2}$$

where:
    A1 is the voltage magnitude for said first RF signal and Angle1 is the dominant signal angle for said first RF signal; and
    A2 is the voltage magnitude for said second RF signal and Angle2 is the smaller signal angle for said second RF signal.

14. A method for calculating an angle for first and second RF signals comprising the steps of:
    (a) receiving a combined RF signal which includes said first RF signal reflected from a dominant target and said second RF signal from a secondary target, wherein said first and second RF signals have different frequencies and are offset in angle from one another;
    (b) calculating a dominant signal angle for said first RF signal by providing an average of a composite angle for said combined RF signal over a frequency difference period;
    (c) providing an angle centroid between said first and second RF signals wherein said angle centroid is provided by an angle at which peaks in power return for said combined RF signals occur;
    (d) calculating a voltage magnitude for each of said first and second RF signals, said voltage magnitude is calculated from peak and minimum power values for said combined RF signals, wherein said voltage magnitude for said first RF signal is calculated in accordance with the following expression:

*A*1=½×(sqrt(Power_Peak)+sqrt(Power_Min))

and said voltage magnitude for said second RF signal is calculated in accordance with the following expression:

*A*2=½×(sqrt(Power_Peak)−sqrt(Power_Min))

where: Power_Peak=10^(peak power for said combined RF signals/10), and Power_Min=10^(minimum power for said combined RF signals/10); and
    (e) calculating a smaller signal angle for said second RF signal in accordance with the following expression:

Angle2=[(*A*1+*A*2)×Angle_Centroid−*A*1×Angle1]/*A*2 where A1 and A2 are the voltage magnitudes for said first and second RF signals, respectively. Angle_Centroid is the angle centroid between said first and second RF signals, and Angle1 is the dominant signal angle for said first RF signal.

15. The method of claim 14 wherein said first and second RF signal have at least a five percent difference in power levels.

16. The method of claim 14 wherein said dominant signal angle for said first RF signal is calculated in accordance with the following expression:

Angle1=Angle_Averaged_Over_Period.

17. The method of claim 16 wherein Angle1 is the average of the composite angle for said combined RF signal between nulls within said composite angle.

18. The method of claim 17 wherein said angle centroid is expressed by the following equation:

$$\text{Angle\_Centroid} = \frac{A1 \times Angle1 + A2 \times Angle2}{A1 + A2}$$

where:
- A1 is the voltage magnitude for said first RF signal and Angle1 is the dominant signal angle for said first RF signal; and
- A2 is the voltage magnitude for said second RF signal and Angle2 is the smaller signal angle for said second RF signal.

* * * * *